United States Patent
Kim et al.

(10) Patent No.: US 9,474,136 B2
(45) Date of Patent: Oct. 18, 2016

(54) INDIVIDUAL LIGHTING CONTROL APPARATUS AND METHOD

(71) Applicant: Electronics and Telecommunications Research Institute, Daejeon (KR)

(72) Inventors: Dae-Ho Kim, Daejeon (KR); You-Jin Kim, Daejeon (KR); Hyun-Seok Kim, Daejeon (KR); Hyun-Jong Kim, Cheongju (KR); Tae-Gyu Kang, Daejeon (KR)

(73) Assignee: ELECTRONICS TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/620,615

(22) Filed: Feb. 12, 2015

(65) Prior Publication Data

US 2015/0230319 A1    Aug. 13, 2015

(30) Foreign Application Priority Data

Feb. 13, 2014  (KR) .................. 10-2014-0016607

(51) Int. Cl.
H05B 37/02    (2006.01)

(52) U.S. Cl.
CPC ...... *H05B 37/0272* (2013.01); *H05B 37/0218* (2013.01); *Y02B 20/46* (2013.01)

(58) Field of Classification Search
CPC ...................................................... H05B 37/02
USPC ............... 315/291, 297, 307, 308, 312, 360
See application file for complete search history.

(56) References Cited

U.S. PATENT DOCUMENTS

| | | | |
|---|---|---|---|
| 7,748,878 B2 * | 7/2010 | Lee ................. | H05B 37/0272 340/5.61 |
| 2011/0140612 A1* | 6/2011 | Mohan ............... | H05B 37/0218 315/149 |
| 2012/0161642 A1 | 6/2012 | Kim et al. | |
| 2013/0088168 A1* | 4/2013 | Mohan ............... | G05B 15/02 315/297 |
| 2014/0184100 A1* | 7/2014 | Yamada ............. | H05B 37/0245 315/297 |

FOREIGN PATENT DOCUMENTS

| | | |
|---|---|---|
| KR | 2006-147183 A | 6/2006 |
| KR | 10-2011-0031082 A | 3/2011 |
| KR | 10-2012-0013862 A | 2/2012 |
| KR | 10-2013-0033852 A | 4/2013 |
| KR | 10-2014-0017419 A | 2/2014 |

\* cited by examiner

*Primary Examiner* — Tung X Le

(57) ABSTRACT

An individual lighting control apparatus and method are disclosed herein. The individual lighting control apparatus includes a reception unit, a terminal connection unit, a sensor unit, and a lighting environment sensing and terminal state determination unit. The reception unit receives the location information of a corresponding individual illumination light. The terminal connection unit acquires the state information of a terminal corresponding to the location information of the illumination light. The sensor unit acquires the sensor information of the set surrounding area of the terminal. The lighting environment sensing and terminal state determination unit sets operation mode based on the state of the connection with the terminal, and then monitors the state of the terminal or the state of the set surrounding area of the terminal in accordance with the set operation mode. The individual illumination light is controlled by providing state change information to a lighting control scheduler.

11 Claims, 5 Drawing Sheets

INDIVIDUAL LIGHTING CONTROL APPARATUS AND METHOD

CROSS-REFERENCE TO RELATED APPLICATION

This application claims the benefit of Korean Patent Application No. 10-2014-0016607, filed Feb. 13, 2014, which is hereby incorporated by reference herein in its entirety.

BACKGROUND

1. Technical Field

The present disclosure relates generally to an individual lighting control apparatus and method and, more particularly, to an apparatus and method for controlling the state of lighting based on the state, location and surrounding environment of a terminal that is being used by an individual.

2. Description of the Related Art

Visible light is light having a wavelength in the range visible to the human eye among electromagnetic waves. The wavelength ranges from 380 to 780 nm. In visible light, a variation in characteristics attributable to a difference in wavelength is exhibited in the form of color, and the wavelength decreases across the spectrum from red to violet. Light having a wavelength longer than that of red color is referred to as infrared light, and light having a wavelength shorter than that of violet is referred to as ultraviolet light. In the case of monochromatic light, 700~610 nm corresponds to red, 610~590 nm corresponds to orange, 590~570 nm corresponds to yellow, 570~500 nm corresponds to green, 500~450 nm corresponds to blue, and 450~400 nm corresponds to violet. A variety of colors can be represented by mixing colors having these wavelengths.

Visible light is visible to humans, unlike infrared light or ultraviolet light. Illumination which emits visible light should satisfy a variety of requirements such as accurate color representation. One of these requirements is little flickering. Since humans cannot perceive 200 or more flickers per second, illumination apparatuses using Light Emitting Diodes (LEDs) having fast flicker performance control flickering using Pulse Width Modulation (PWM) in order to increase the lifespan thereof and save energy.

Communication technology using light includes Infrared Data Association (IrDA) using the infrared range, VLC using visible light, and optical communication using optical fiber.

Although the Infrared Data Association (IrDA) is a non-governmental standard organization that was found in 1993 to establish standards for infrared data communications, IrDA also refers to the communication standards established by the IrDA. Principal standards for PC personal computers include IrDA1.0 for a maximum data transmission speed ranging from 2.4 to 115.2 kbps and IrDA1.1 for maximum data transmission speeds of 1.152 Mbps and 4 Mbps. IrDA is technology for performing communication using a wavelength in the infrared range from 850 to 900 nm.

VLC is a wireless communication technology using a wavelength in the range of 380 nm to 780 nm. The visible light communication standardization process is being conducted within the IEEE 802.15 Wireless Personal Area Network (WPAN) Working Group. In Korea, the Telecommunications Technology Association (TTA) is operating a visible light communication working group.

For example, Korean Patent Application Publication No. 10-2011-0031082 entitled "VLC Method and Apparatus capable of Controlling Brightness of Light Source while Minimizing Reduction in Brightness of Light Source" discloses technology that is capable of, when a VLC transmission function is provided to a lighting device or a visual light source, controlling the brightness of the lighting device or the visual light source while minimizing a reduction in the brightness of the lighting device or the visual light source which is generated by communication coding and modulation functions.

However, although the conventional lighting control technology is used to control the brightness of a lighting device or a light source within a set area or a corresponding area, there is a need for individual user-centric lighting control technology that will be more efficient in terms of energy conservation.

SUMMARY

Embodiments of the present invention are directed to the provision of an apparatus and method for controlling the state of lighting based on the state, location and surrounding environment of a terminal that is being used by an individual.

In accordance with an aspect of the present invention, there is provided an individual lighting control method, including setting, by a sensing node, operation mode based on the state of the connection with a corresponding terminal; registering the location information of the terminal with a lighting control scheduler; monitoring the state of the terminal or the state of the set surrounding area of the terminal in accordance with the operation mode; and controlling an individual illumination light corresponding to the terminal by providing state change information, detected during the monitoring of the state of the terminal, to the lighting control scheduler.

Setting the operation mode may include, if the sensing node has been connected to the corresponding terminal, setting the operation mode to monitoring mode in which both the state of the terminal and the state of the set surrounding area of the terminal are monitored.

Setting the operation mode may include, if the sensing node has not been connected to the corresponding terminal, setting the operation mode to sensor mode in which only the state of the set surrounding area of the terminal is monitored.

Registering may include, if the operation mode is monitoring mode, registering not only the location information of the terminal but also lighting control information based on the state of the terminal.

Monitoring may include monitoring the state based on the sensor information of the set surrounding area.

The location information of the terminal may be acquired via visual light communication (VLC).

In accordance with another aspect of the present invention, there is provided an individual lighting control apparatus, including a reception unit configured to receive the location information of a corresponding individual illumination light; a terminal connection unit configured to acquire the state information of a terminal corresponding to the location information of the illumination light; a sensor unit configured to acquire the sensor information of the set surrounding area of the terminal; and a lighting environment sensing and terminal state determination unit configured to set operation mode based on the state of the connection with the terminal and monitor the state of the terminal or the state of the set surrounding area of the terminal in accordance with the set operation mode; wherein the individual illumination light corresponding to the terminal is controlled by providing state change information, sensed by the lighting environment sensing and terminal state determination unit, to a lighting control scheduler.

The lighting environment sensing and terminal state determination unit may be further configured to, if it has been connected to the corresponding terminal, set the operation mode to monitoring mode in which both the state of the terminal and the state of the set surrounding area of the terminal are monitored.

The lighting environment sensing and terminal state determination unit may be further configured to, if it has not been connected to the corresponding terminal, set the operation mode to sensor mode in which only the state of the set surrounding area of the terminal is monitored.

The reception unit may be further configured to receive the location information of the illumination light via VLC and to acquire location information of the terminal based on the received location information of the illumination light.

The sensor unit may be further configured to acquire brightness information, color information and temperature information of the set surrounding area of the terminal.

The lighting environment sensing and terminal state determination unit may be further configured to, prior to monitoring the state the terminal or the state of the set surrounding area of the terminal, set lighting control information based on the state of the terminal and register the set lighting control information with the lighting control scheduler.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Figure 1:
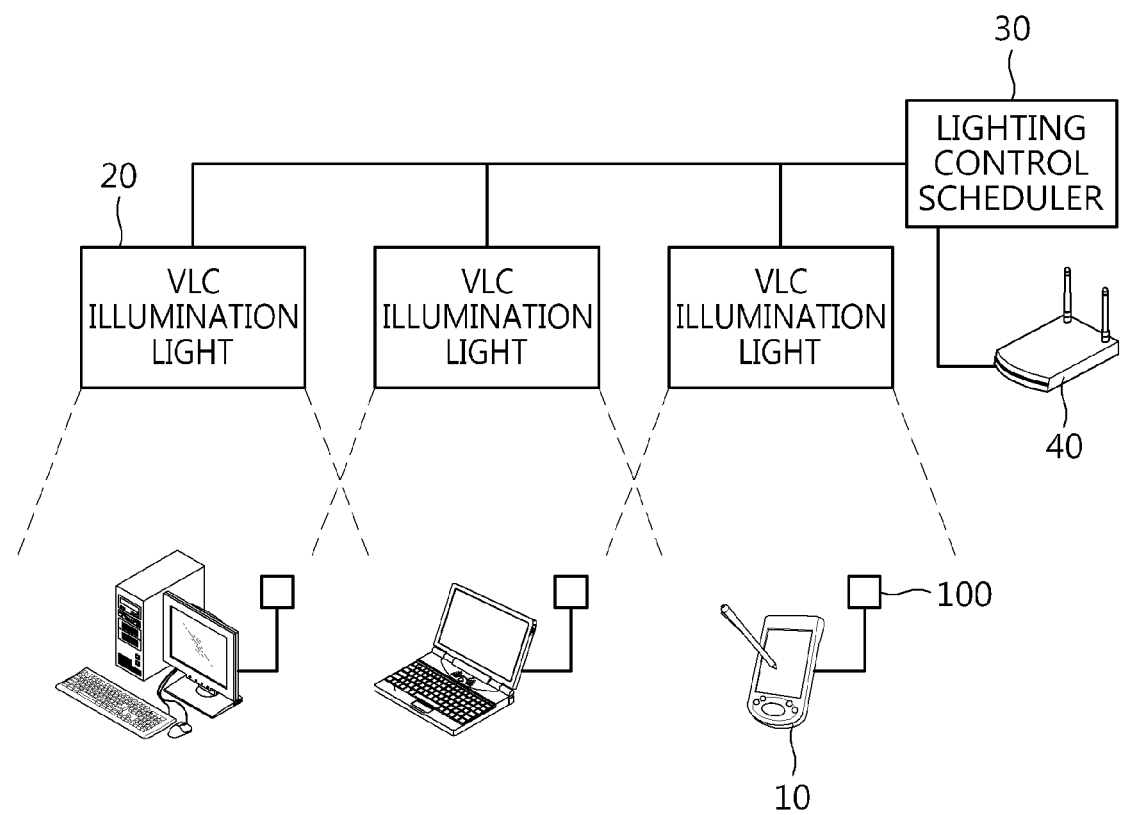
FIG. 1 is a diagram of an environment to which an individual lighting control apparatus according to an embodiment of the present invention is applied.

Embodiments of the present invention will be described in detail below with reference to the accompanying drawings. Repeated descriptions and descriptions of well-known functions and configurations that have been deemed to make the gist of the present invention unnecessarily obscure will be omitted below. The embodiments of the present invention are intended to fully describe the present invention to persons having ordinary knowledge in the art to which the present invention pertains. Accordingly, the shapes, sizes, etc. of components in the drawings may be exaggerated to make the description obvious.

An individual lighting control apparatus and method according to embodiments of the present invention are described in detail with reference to the accompanying drawings.

FIG. 1 is a diagram of an environment to which an individual lighting control apparatus according to an embodiment of the present invention is applied.

Referring to FIG. 1, in the environment to which individual lighting control service according to an embodiment of the present invention is applied, individual terminals 10, sensing nodes 100, illumination lights 20, a lighting control scheduler 30, and a wireless communication device 40 are located.

The individual terminals 10 are connected to the sensing nodes 100, respectively.

The sensing nodes 100 have a function capable of receiving the location information of the terminal 10 via VLC and a function capable of determining the state of a terminal connected to sensors that can sense the states of an illumination light and a surrounding environment.

The illumination lights 20 corresponding to the individual terminals 10 may transmit their locations using VLC technology. These illumination lights 20 are connected to the lighting control scheduler 30 over a lighting control network.

The lighting control scheduler 30 is connected to the wireless communication device 40 capable of wirelessly communicating with the sensing nodes 100.

In this environment, when each of the illumination lights 20 transmits its location information, a corresponding sensing node 100 acquires the location information and then becomes aware of a current location.

Furthermore, each of the sensing nodes 100 monitors the state of a terminal 10 connected thereto, and transfers the state change information of the terminal corresponding to the result of the detection of a change to the lighting control scheduler 30 via a wireless communication function.

The lighting control scheduler 30 determines the state of the terminal based on the state change information of the terminal received from the sensing node 100, and controls lighting based on the determined state of the terminal. Furthermore, regardless of the state of the terminal, the sensing node 100 senses surrounding environment information, and transfers the sensed surrounding environment information to the lighting control scheduler 30 periodically or whenever a state change is sensed. Then the lighting control scheduler 30 may control the state of lighting based on the surrounding environment information.

Next, the sensing node 100 is described in detail with reference to FIG. 2.

Figure 2:
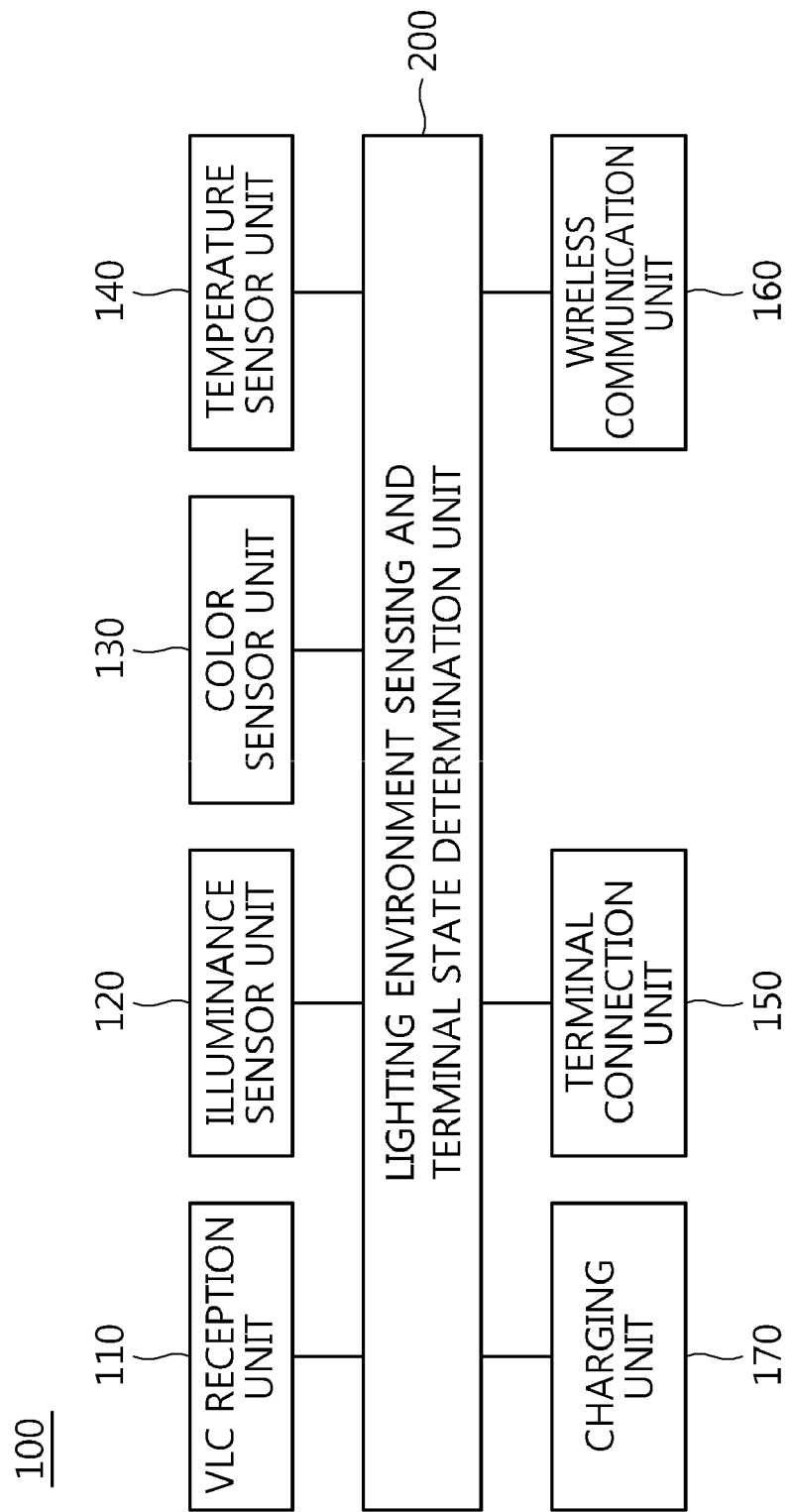
FIG. 2 is a diagram illustrating the schematic configuration of a sensing node according to an embodiment of the present invention.

FIG. 2 is a diagram illustrating the schematic configuration of the sensing node 100 according to an embodiment of the present invention.

Referring to FIG. 2, the sensing node 100 includes a VLC reception unit 110, an illuminance sensor unit 120, a color sensor unit 130, a temperature sensor unit 140, a terminal connection unit 150, a wireless communication unit 160, a charging unit 170, and a lighting environment sensing and terminal state determination unit 200.

The VLC reception unit 110 receives the location information of a corresponding illumination light 20 using VLC.

The illuminance sensor unit 120 acquires the brightness information of a set surrounding area.

The color sensor unit 130 acquires the color information of the set surrounding area.

The temperature sensor unit 140 acquires the temperature information of the set surrounding area.

The terminal connection unit 150 is connected to a corresponding terminal 10, and acquires the state information of the terminal 10.

The wireless communication unit 160 performs wireless communication with the wireless communication device 40 connected to the lighting control scheduler 30.

The lighting environment sensing and terminal state determination unit 200 not only senses the lighting environment of the set surrounding area corresponding to the location information of the corresponding illumination light 20 using the above-described components, but also determines the state of the terminal 10 connected thereto.

Next, the lighting environment sensing and terminal state determination unit 200 is described in detail with reference to FIG. 3.

Figure 3:
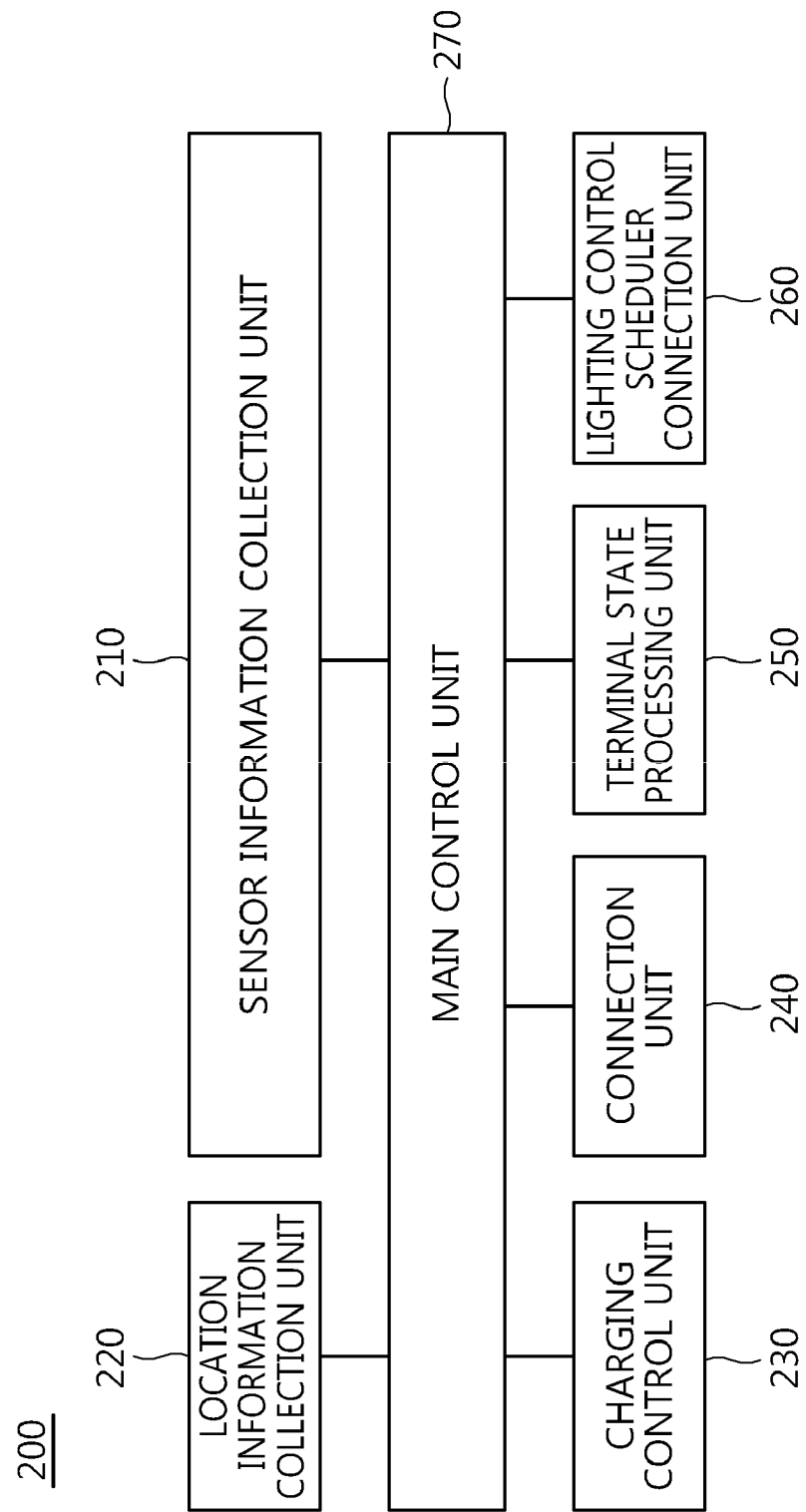
FIG. 3 is a diagram illustrating the schematic configuration of a lighting environment sensing and terminal state determination unit according to an embodiment of the present invention.

FIG. 3 is a diagram illustrating the schematic configuration of the lighting environment sensing and terminal state determination unit according to an embodiment of the present invention.

Referring to FIG. 3, the lighting environment sensing and terminal state determination unit 200 includes a sensor information collection unit 210, a location information collection unit 220, a charging control unit 230, a connection unit 240, a terminal state processing unit 250, a lighting control scheduler connection unit 260, and a main control unit 270.

The sensor information collection unit 210 collects the sensor information of a set surrounding area. In this case, the sensor information includes brightness information, color information, and temperature information. In this case, the sensor information of the surrounding area may include not only brightness information, color information and temperature information but also various information of a pressure or presence sensor capable of determines whether a user is sitting on a chair or the like, a gyro sensor capable of determining the movement of the terminal, etc. However, the sensor information of the surrounding area is not limited thereto.

The location information collection unit 220 collects the location information of a corresponding illumination light 20 received via the VLC reception unit 110.

The charging control unit 230 controls the charging of the charging unit 170 via the terminal connection unit 150.

The connection unit 240 functions to transfer the state information of the terminal 10, acquired via the terminal connection unit 150, to the terminal state processing unit 250.

The terminal state processing unit 250 determines the state of the terminal 10 based on the received state information of the terminal 10.

The state of the terminal 10 according to an embodiment of the present invention is indicative of the operation state of the terminal 10 to which the sensing node 100 is connected. The state of the terminal 10 may be classified as an "ON state" indicative of a state in which a terminal user is normally using the terminal, an "OFF state" indicative of a state in which the power of the terminal has been turned off, a "standby state" indicative of a state in which the terminal user is absent for a while, or a "power-saving state" indicative of a state in which the terminal user does not use the terminal for a long time.

The lighting control scheduler connection unit 260 performs communication with the lighting control scheduler 30 via the wireless communication unit 160.

The main control unit 270 determines operation mode based on the state of the connection with the terminal 10, and performs sensing based on the determined operation mode.

In this case, the operation mode include monitoring mode in which the terminal 10 and the sensing node 100 are connected to each other and both the state of the terminal 10 and its surrounding area are all monitored and sensor mode in which the terminal 10 and the sensing node 100 are not connected to each other and only a surrounding area is monitored. The main control unit 270 performs monitoring based on operation mode, and transfers a change to the lighting control scheduler 30 when the change is sensed.

Next, an individual lighting control method is described in detail with reference to FIGS. 4 and 5.

Figure 4:
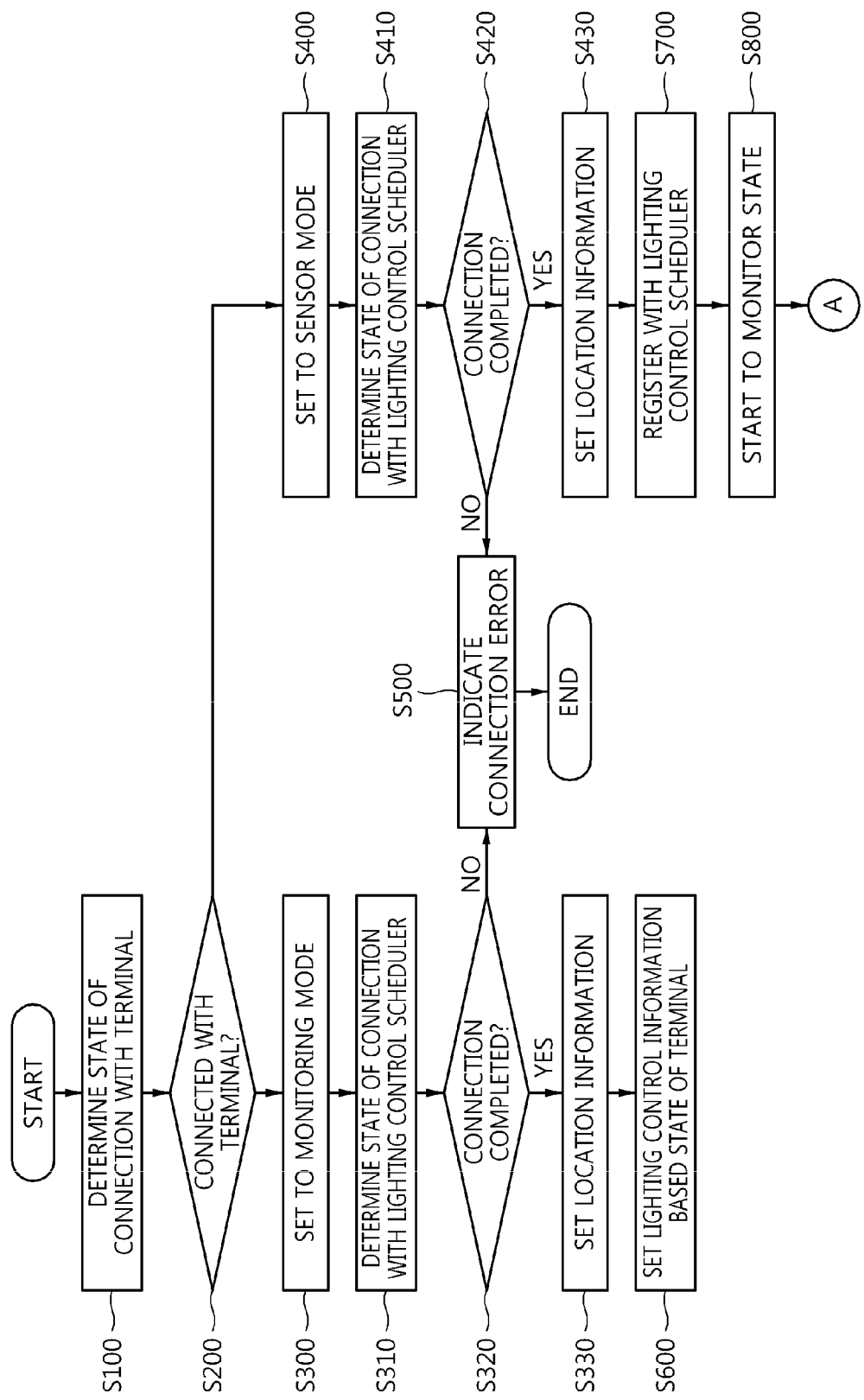
FIG. 4 is a flowchart illustrating an individual lighting control method according to an embodiment of the present invention.

FIG. 4 is a flowchart illustrating an individual lighting control method according to an embodiment of the present invention.

Referring to FIG. 4, the sensing node 100 determines the state of the connection with a corresponding terminal 10 at step S100.

The sensing node 100 determines whether the connection with the corresponding terminal 10 has been completed at step S200.

If the connection with the corresponding terminal 10 has been completed, the sensing node 100 set operation mode to monitoring mode at step S300. In this case, the monitoring mode refers to mode in which the terminal 10 is connected with the sensing node 100 and both the state of the terminal 10 and its surrounding area are monitored.

If the sensing node 100 is not connected with the corresponding terminal 10, the sensing node 100 sets operation mode to sensor mode at step S400. In this case, the sensor mode refers to mode in which the terminal 10 and the sensing node 100 are not connected to each other and only a surrounding area is monitored.

After the monitoring mode or sensor mode has been set, the sensing node 100 determines the state the connection with the lighting control scheduler 30 at step S310 or S410.

The sensing node 100 determines whether the connection with the lighting control scheduler 30 has been completed at step S320 or S420. If there is no connection with lighting control scheduler 30, the sensing node 100 indicates a connection error and terminates at step S500.

If the connection with the lighting control scheduler 30 has been completed, the sensing node 100 collects location information and sets the location information of the corresponding terminal 10 based on the collected location information at step S330 or S430. In this case, if the sensing node 100 does not collect location information, a user may directly set location information at the terminal 10. However, this is not limiting.

The sensing node 100 sets lighting control information based on the state of the terminal 10 at step S600.

More specifically, the sensing node 100 sets the brightness or illuminance of lighting in accordance with the state of the terminal 10. For example, a brightness of 100% or an illuminance of 640 lux is set for the ON state, a brightness of 20% or an illuminance of 160 lux is set for the OFF state, a brightness of 80% or an illuminance of 640 lux is set for the standby state, and a brightness of 40% or an illuminance of 320 lux is set for the power-saving state.

Next, the sensing node 100 registers the location information of the corresponding terminal 10 and the lighting control information based on the state of the terminal 10 set at step S600 with the lighting control scheduler 30 at step S700.

The sensing node 100 starts to monitor the state of the terminal 10 and the state of the surrounding area of the terminal 10 at step S800, and transfers the changed state information of the results of the monitoring to the lighting control scheduler 30 at step S900.

Next, a process in which the sensing node 100 monitors the state of the terminal 10 and the state of the surrounding area of the terminal 10 is described in detail with reference to FIG. 5.

Figure 5:
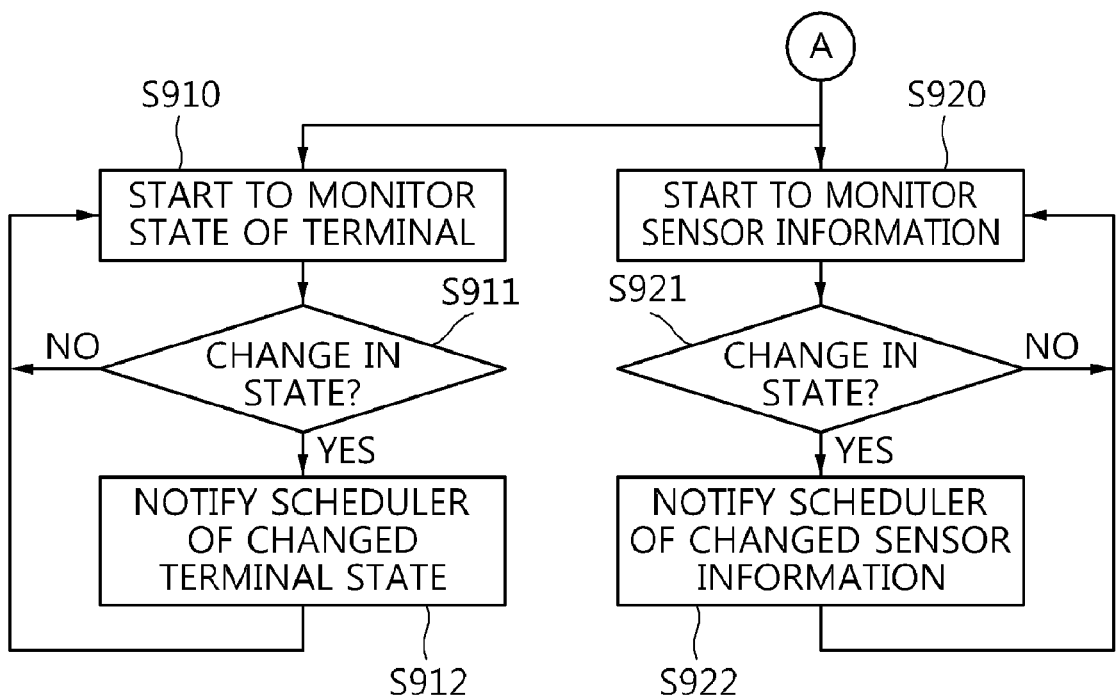
FIG. 5 is a flowchart illustrating a method of monitoring the state of a terminal and the state of the surrounding area of the terminal according to an embodiment of the present invention.

FIG. 5 is a flowchart illustrating a method of monitoring the state of a terminal and the state of the surrounding area of the terminal according to an embodiment of the present invention.

Referring to FIG. 5, the sensing node 100 starts to monitor whether there is a change in the operation state of the terminal 10 at step S910. In this case, the state of the terminal 10 may be classified as an "ON state" indicative of a state in which a terminal user is normally using the terminal, an "OFF state" indicative of a state in which the power of the terminal has been turned off, a "standby state" indicative of a state in which the terminal user is absent for a while, or a "power-saving state" indicative of a state in which the terminal user does not use the terminal for a long time.

The sensing node 100 determines whether there is a change in the operation state of the terminal 10 at step S911.

If there is a change in the operation state of the terminal 10, the sensing node 100 notifies the lighting control scheduler 30 of the changed operation state of the terminal 10 at step S912.

The sensing node 100 starts to monitor not only whether there is a change in the operation state of the terminal 10 but also whether there is a change in the sensor information of the surrounding area of the terminal 10 at step S920. In this case, the sensor information of the surrounding area may include not only brightness information, color information and temperature information but also various information of a pressure or presence sensor capable of determines whether a user is sitting on a chair or the like, a gyro sensor capable of determining the movement of the terminal, etc. However, the sensor information of the surrounding area is not limited thereto.

The sensing node 100 determines whether there is a change in the sensor information of the surrounding area of the terminal 10 at step S921.

If there is a change in the sensor information of the surrounding area of the terminal 10, the sensing node 100 notifies the lighting control scheduler 30 of the changed sensor information at step S922.

Then the lighting control scheduler 30 controls the state of lighting based on the changed sensor information.

As described above, the present invention can control the state of lighting based on the state, location and surrounding environment of a terminal that is being used by an individual.

In accordance with the present invention, the individual lighting control apparatus and method are configured to receive location information from an illumination light using VLC technology when a user uses a desktop, a notebook, a smart phone, measuring equipment or the like and then control the brightness of surrounding lighting based on the state of the equipment, such an ON, standby, power saving or OFF state, when the user stops using the equipment, thereby maximizing the function of reducing the energy of lighting.

In particular, the present invention achieves a better energy conservation effect than conventional lighting control apparatuses that perform control on a room, chamber, or section basis because the present invention is configured to perform lighting control on an individual user basis.

As described above, the optimum embodiments have been disclosed in the drawings and the specification. Although specific terms have been used herein, they have been used merely for the purpose of describing the present invention, but have not been used to restrict their meanings or limit the scope of the present invention set forth in the claims. Accordingly, it will be understood by those having ordinary knowledge in the relevant technical field that various modifications and other equivalent embodiments can be made. Therefore, the true ranges of protection of the present invention should be defined based on the technical spirit of the attached claims.

What is claimed is:

1. An individual lighting control method, comprising:
   setting, by a sensing node, operation mode based on a state of connection with a corresponding terminal;
   registering location information of the terminal with a lighting control scheduler;
   monitoring a state of the terminal or a state of a set surrounding area of the terminal in accordance with the operation mode; and
   controlling an individual illumination light corresponding to the terminal by providing state change information, detected during the monitoring of the state of the terminal, to the lighting control scheduler,
   wherein setting the operation mode comprises:
   if the sensing node has been connected to the corresponding terminal, setting the operation mode to monitoring mode in which both the state of the terminal and the state of the set surrounding area of the terminal are monitored.

2. The individual lighting control method of claim 1, wherein setting the operation mode comprises:
   if the sensing node has not been connected to the corresponding terminal, setting the operation mode to sensor mode in which only the state of the set surrounding area of the terminal is monitored.

3. The individual lighting control method of claim 1, wherein registering comprises:
   if the operation mode is monitoring mode, registering not only the location information of the terminal but also lighting control information based on the state of the terminal.

4. The individual lighting control method of claim 1, wherein monitoring comprises:
   monitoring the state based on sensor information of the set surrounding area.

5. The individual lighting control method of claim 1, wherein the location information of the terminal is acquired via visual light communication (VLC).

6. An individual lighting control apparatus, comprising:
   a reception unit configured to receive location information of a corresponding individual illumination light;
   a terminal connection unit configured to acquire state information of a terminal corresponding to the location information of the illumination light;
   a sensor unit configured to acquire sensor information of a set surrounding area of the terminal; and
   a lighting environment sensing and terminal state determination unit configured to set operation mode based on a state of connection with the terminal and monitor a state of the terminal or a state of the set surrounding area of the terminal in accordance with the set operation mode;
   wherein the individual illumination light corresponding to the terminal is controlled by providing state change information, sensed by the lighting environment sensing and terminal state determination unit, to a lighting control scheduler.

7. The individual lighting control apparatus of claim 6, wherein the lighting environment sensing and terminal state determination unit is further configured to:
   if it has been connected to the corresponding terminal, set the operation mode to monitoring mode in which both the state of the terminal and the state of the set surrounding area of the terminal are monitored.

8. The individual lighting control apparatus of claim 6, wherein the lighting environment sensing and terminal state determination unit is further configured to:
   if it has not been connected to the corresponding terminal, set the operation mode to sensor mode in which only the state of the set surrounding area of the terminal is monitored.

9. The individual lighting control apparatus of claim 6, wherein the reception unit is further configured to:
   receive the location information of the illumination light via VLC; and
   acquire location information of the terminal based on the received location information of the illumination light.

10. The individual lighting control apparatus of claim 6, wherein the sensor unit is further configured to:
    acquire brightness information, color information and temperature information of the set surrounding area of the terminal.

11. The individual lighting control apparatus of claim 6, wherein the lighting environment sensing and terminal state determination unit is further configured to, prior to monitoring the state the terminal or the state of the set surrounding area of the terminal:
    set lighting control information based on the state of the terminal; and
    register the set lighting control information with the lighting control scheduler.

\* \* \* \* \*